United States Patent Office 3,066,867
Patented Dec. 4, 1962

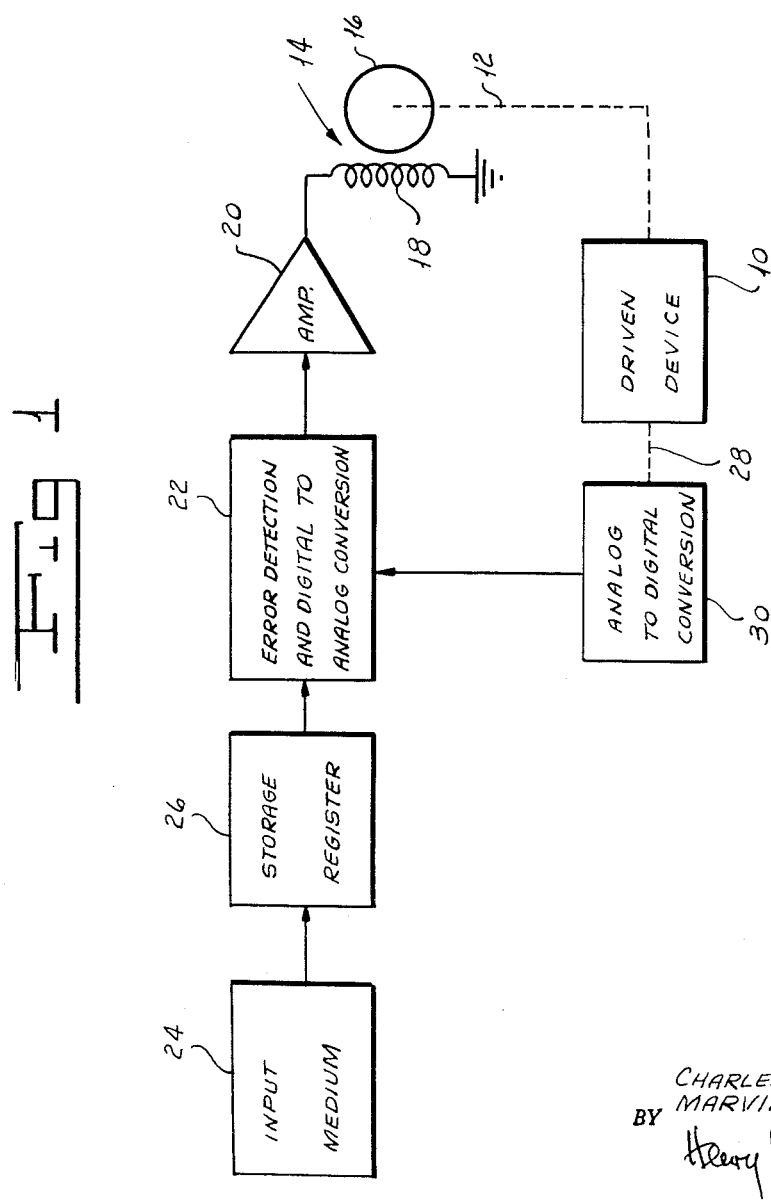

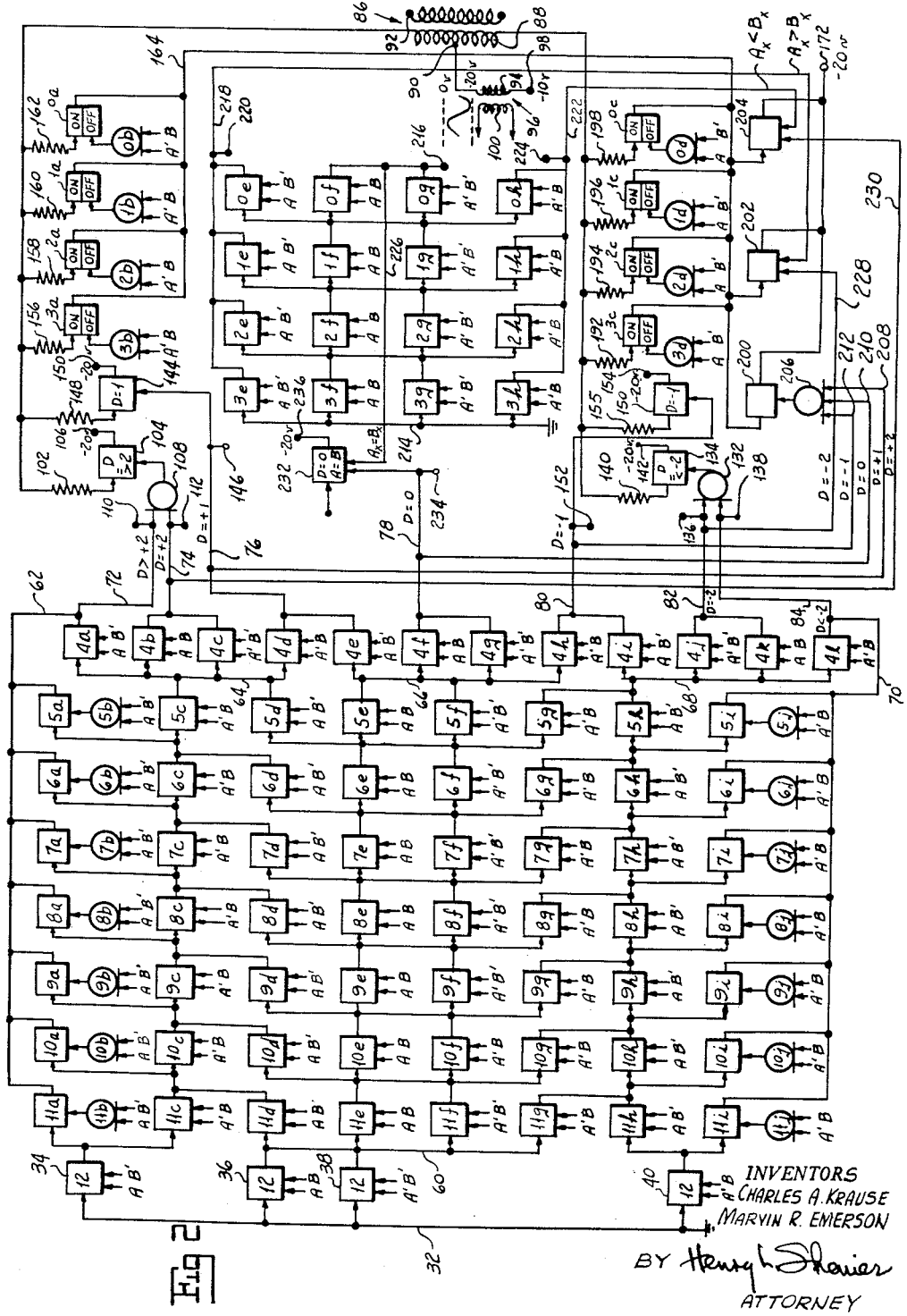

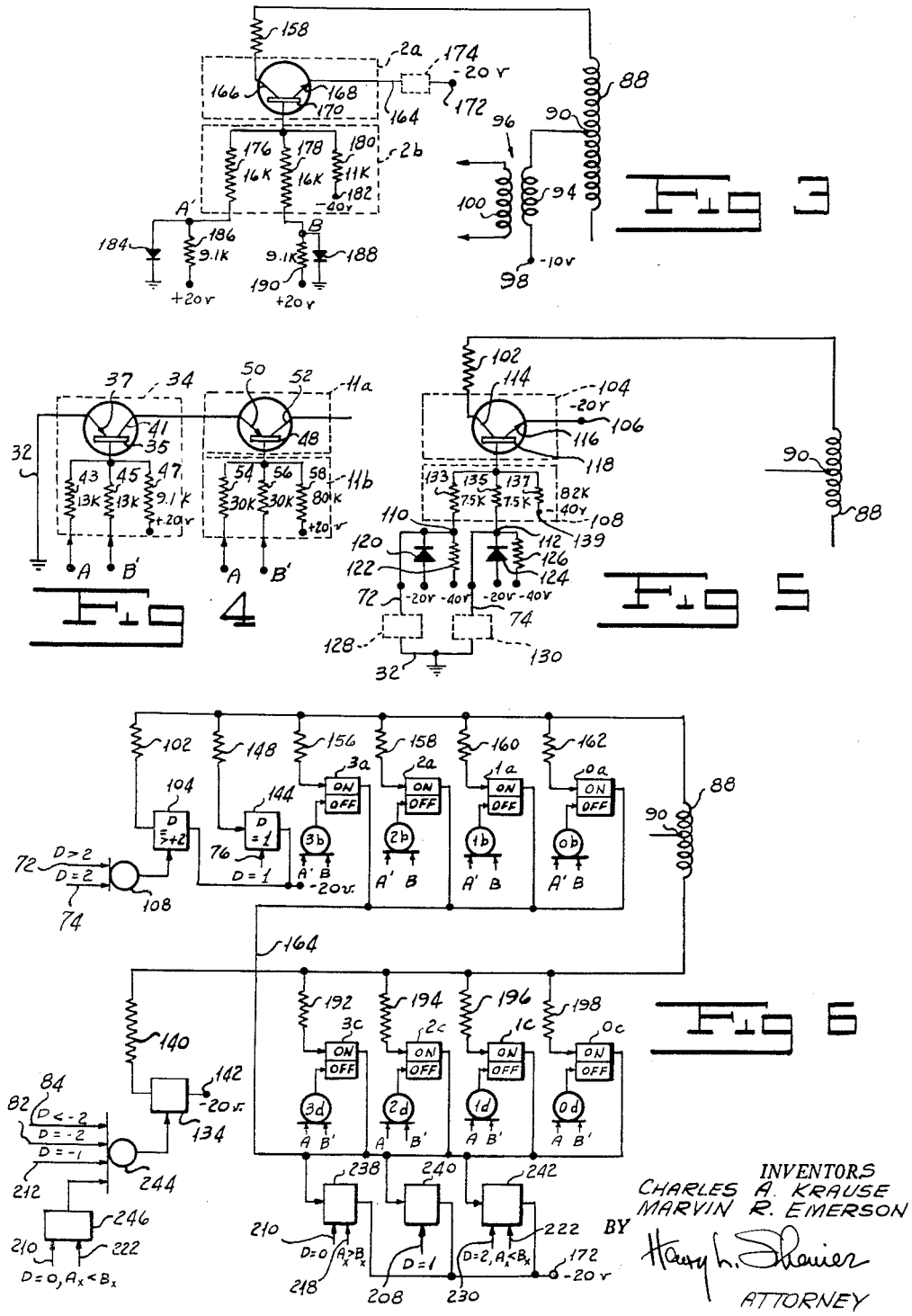

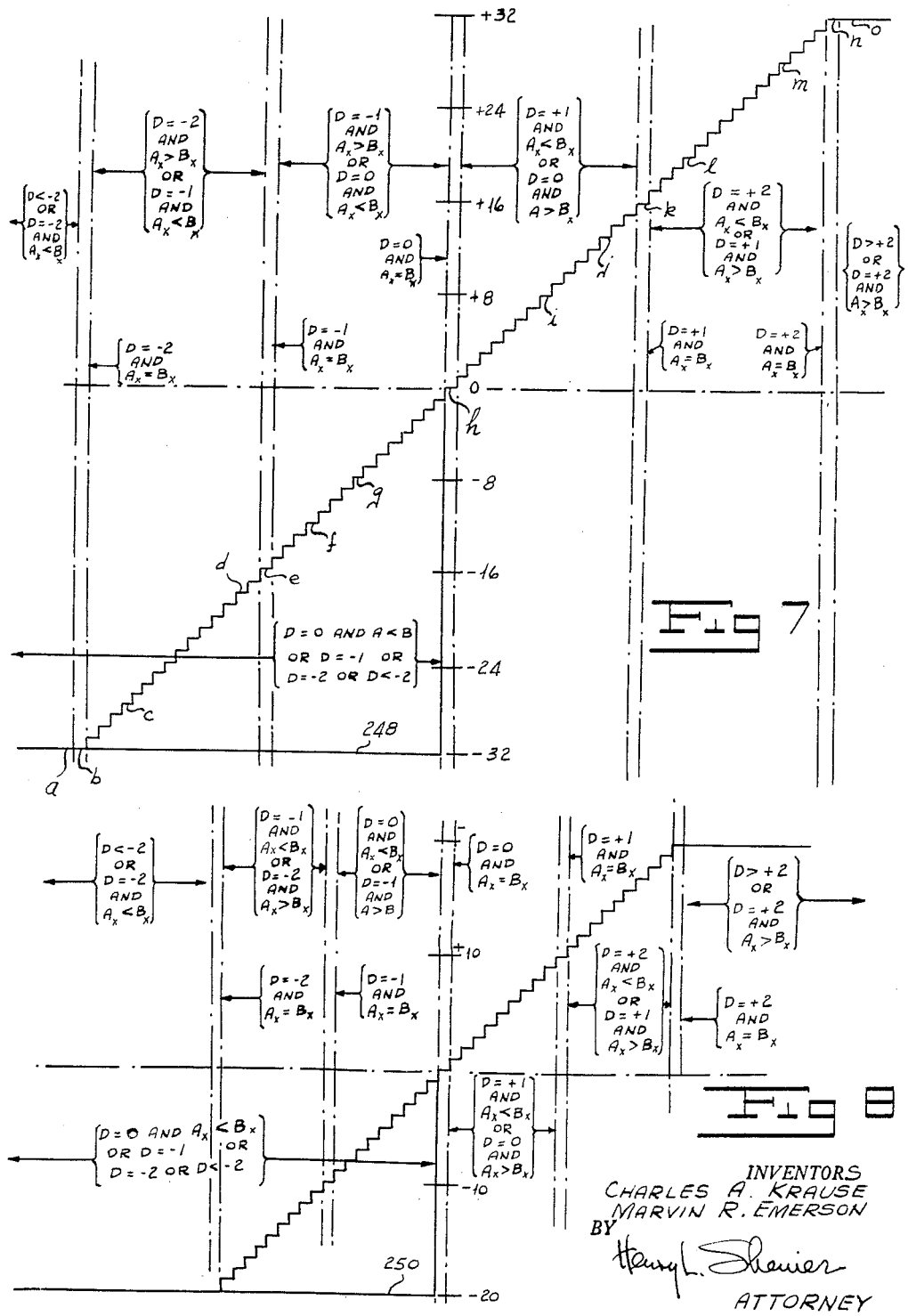

3,066,867
DIGITAL COMPARATOR AND DIGITAL-TO-ANALOGUE CONVERTER
Charles A. Krause, Gardena, and Marvin R. Emerson, Rolling Hills, Calif., assignors, by mesne assignments, to United Aircraft Corporation, East Hartford, Conn., a corporation of Delaware
Filed Feb. 19, 1958, Ser. No. 716,170
20 Claims. (Cl. 235—177)

Our invention relates to a digital comparator and digital-to-analogue converter and more particularly to a device for comparing two digital representations to produce an output signal which is the analogue of the difference between the digital representations.

As is known in the art, digital servomechanisms for control applications such as machine tool control, fire control, gyroscope stabilization, and the like have the theoretical advantages over analogue servomechanisms of being more accurate, more versatile, and more easily programmed to achieve the desired control. The actual use of digital servomechanisms has been limited by the fact that all of the required components of such a system are not commercially available. The usual analogue servomechanism includes a drive means, a source of a signal proportional to the calculated control, a feed-back device responsive to the drive means for producing a signal which is compared with the calculated control signal to produce an error signal which energizes the drive means. Analogue-to-digital converters which may be responsive to a drive means to produce a digital representation of the actual condition of the controlled member are known in the prior art. One such converter is disclosed in the copending application of Jack B. Speller, Serial No. 464,774, filed October 26, 1954, now Patent No. 2,873,440. In order that an error signal be produced in a digital servomechanism including a converter of the type disclosed in the copending application, some means must be provided for comparing the digital output of the converter with a digital representation of the desired control. At present no simple, reliable system for accomplishing this comparison within the limits of practical economics is known in the art.

One type of digital error detection which has been suggested is the serial subtraction of the two digital representations. This system has the disadvantage of requiring that a sampling technique be used, resulting in time discontinuity in the servo loop. Unless the servomechanism is an element of a serial computing system, additional equipment is required to generate timing and synchronizing pulses. In such a serial subtraction system the circuitry must operate rapidly to minimize time discontinuities, thus increasing the cost and complexity of the system. It will be seen that in a practical system, the subtraction of the digital representations most desirably is accomplished on a continual basis rather than by sampling techniques.

We have invented a digital comparator and digital-to-analogue converter which produces an analogue of the difference between two digital representations. Our device operates on a continuous basis so that there is no discontinuity in the output to the error signal channel. Our arrangement is relatively simple and is inexpensive to produce for the result achieved. Our comparator and converter utilizes stored digital information directly without requiring expensive conversion apparatus. The continuous operation of our system reduces the required frequency response of the system components to reduce the component cost and to reduce the complexity of the circuitry. Our system employs only components having no moving parts with the result that it is highly reliable.

One object of our invention is to provide a digital comparator and digital-to-analogue converter which produces an analogue of the difference between two digital representations.

Another object of our invention is to provide a digital comparator and digital-to-analogue converter which operates continuously.

A further object of our invention is to provide a digital comparator and digital-to-analogue converter in which there is no discontinuity between the input and output to the error channel of the system with which our comparator is used.

Yet another object of our invention is to provide a digital comparator and digital-to-analogue converter which utilizes stored digital programming information without auxiliary conversion apparatus.

A still further object of our invention is to provide a digital comparator and digital-to-analogue converter which is relatively simple and inexpensive for the result achieved by the comparator.

A still further object of our invention is to provide a digital comparator and digital-to-analogue converter which is reliable.

Other and further objects of our invention will appear from the following description.

In general, our invention contemplates the provision of a digital comparator and digital-to-analogue converter for comparing two digital representations to produce a signal which is the analogue of the difference between the representations including a transformer having a primary winding center tap to which we apply an alternating signal adapted to produce currents of opposite polarity in the two halves of the primary winding. A first plurality of logic circuit components adapted to be rendered conductive by digits of the representations having a significance less than a predetermined significance are adapted to connect resistances of various values in the circuits of the respective primary winding halves. We so arrange these components and so select the values of the resistances associated with the respective components that the net current flow in the primary winding is the analogue of the difference between the digits of the representations which control these first elements. A second plurality of logic circuit components, adapted to be rendered conductive by the digits of higher significance than said predetermined significance, condition the first plurality of components to operate when the difference in the representations is less than a predetermined difference. When the difference between the representations is greater than the predetermined difference, the second plurality of components de-activates the first plurality and connects a resistance of predetermined value in the circuit of one of the primary halves to produce a primary winding current having a polarity representing the direction of the difference. It will be seen that the secondary winding of the transformer has an induced voltage which is the analogue of the difference between the digital representations. In this manner we achieve a proportional control up to the predetermined difference and a constant control for differences greater than this predetermined value. In a modified form, our invention provides a control system adapted to overshoot in one direction of the error only so that null is approached from one prescribed direction. Our comparator may be arranged to operate either in a normal binary coded system or in a binary coded decimal system.

In the accompanying drawings which form part of the instant specification and which are to be read in conjunction therewith and in which like reference numerals are used to indicate like parts in the various views:

FIGURE 1 is a block diagram of a servomechanism employing our comparator and digital-to-analogue converter.

FIGURE 2 is a schematic view of one form of our digital comparator and digital-to-analogue converter.

FIGURE 3 is a schematic view showing the details of certain of the logic circuit components of our digital comparator and digital-to-analogue converter.

FIGURE 4 is a schematic view showing the details of others of the logic circuit components of our digital comparator and digital-to-analogue converter.

FIGURE 5 is a schematic view showing the details of still another of the logic circuit components of our digital comparator and digital-to-analogue converter.

FIGURE 6 is a schematic view showing a modified form of a portion of the circuitry shown in FIGURE 1 in the form of our digital comparator and digital-to-analogue converter which is adapted to overshoot in one direction of error.

FIGURE 7 is a schematic view showing graphs of the output signal versus error detection of the forms of our digital comparator and digital-to-analogue converter shown in FIGURES 2 and 6.

FIGURE 8 is a schematic view showing graphs of output signal versus error detection for a form of our digital comparator and digital-to-analogue converter adapted to operate in a binary coded decimal system.

Referring now more particularly to FIGURE 1 of the drawings, one form of servomechanism with which our digital comparator is adapted to be used includes a driven device 10 such as a machine tool or the like adapted to be driven by the shaft 12 of a motor indicated generally by the reference character 14 having an armature 16 and a field winding 18. As is known in the art, winding 18 is adapted to be energized with a current of one polarity or the other to cause armature 16 to rotate in one direction or the other. An amplifier 20 amplifies the output signal of an error detection and digital-to-analogue conversion unit 22 to energize winding 18. An input medium 24 such, for example, as a digital computer, feeds a storage register 26 which supplies programming information in the form of a binary digital representation to one input channel of the unit 22. A mechanical means such as a shaft 28 driven by the device 10 drives the input shaft of an analogue-to-digital converter 30 which supplies a second input channel of unit 22 with a digital representation of the actual position of the driven device. The converter 30 may, for example, be of the type disclosed in the copending application referred to hereinabove. As has been explained hereinabove, the unit 22 which may be our digital comparator and digital-to-analogue converter compares the digital representation provided by the storage register 26 with the digital representation provided by the converter 30 to produce an output signal which is the analogue of the difference between the two representations.

For the purposes of clarity in exposition, let us assume, for example, that the storage register 26 produces an output representation which we may designate as A having respective digital bits $A_0$ to $A_{12}$ in order of significance from the least significant bit $A_0$ to the most significant bit $A_{12}$. Let us represent the output of the converter 30 as the representation having bits from least significant to most significant of $B_0$ to $B_{12}$. We have by way of example selected binary numbers which include 13 digits. It will be understood, of course, that our system is capable of comparing binary numbers having more or less digits. With binary numbers of thirteen places it will be obvious that the largest difference between the numbers is 8191. It will be appreciated that it is unreasonable to expect a difference of 1 to exert positive control and to maintain linearity of amplifiers and output mechanisms in a range of over 8,000 to 1. Further, the action of the servomechanism itself will prevent large differences from occurring except for stepped inputs which can be controlled in a programmed system. For this reason, we have assumed that proportional control over a range of differences of the binary representations from −32 to +32 is adequate for the purposes for which our system will be used. With this in mind, we have divided the number A, for example, into a first part $A_X$ including the digital bits of the number from $A_0$ to $A_3$ and a portion $A_D$ including the bits from $A_4$ to $A_{12}$. The number B is similarly divided into $B_X$ and $B_D$. Further, we have indicated a difference D between the representations of $\pm 16$ as being $D=\pm 1$. It follows from this that if the difference between the representations is exactly $\pm 32$ then $D=\pm 2$. Further, it will be seen that if the difference between the representations is between +16 and −16 then $D=0$. In this latter case, of course, $A_X > B_X$, $A_X = B_X$, or $A_X < B_X$.

Referring now to FIGURE 2 in which we have shown the logic circuitry for comparing the digital representations to produce a signal representing the analogue of the difference between the representations, a conductor 32 connects the input terminals of a plurality of respective logic circuit components 34, 36, 38, and 40 to appropriate return voltage. Each of the elements 34, 36, 38, and 40 has a pair of actuating signal inputs to which we feed the most significant digital bits of the respective digital representations. It is to be understood, as will be explained hereinafter, that a "1" in the particular form of our system shown is represented by a negative potential of twenty volts, while a "0" is represented by ground potential. Further, the complement of any bit such as $B_{12}$, is designated by a printed reference letter—as $\bar{B}_{(12}$. The complement of a "1" is a "0" represented by ground potential, while the complement of a "0" is a "1" which is represented by a negative potential of twenty volts.

Referring now to FIGURE 4, we have shown the details of an element such as the element 34 which includes a p-n-p transistor having a base 35, an emitter 37, and a collector 41. We connect one terminal of each of three respective resistors 43, 45, and 47 to the base 45. We apply a bias potential to the terminal of one of the resistors such as the resistor 47 to render the transistor normally non-conductive. It will be appreciated that since conductor 32 connects emitter 47 to ground, the base 45 must be brought below ground potential before the transistor conducts. We so select the bias potential applied to resistor 47 and the respective resistances of resistors 43, 45, and 47 that the transistor is normally nonconductive and will not conduct until potentials corresponding to "1's" are applied to both the resistors 43 and 45. By way of illustration, we have shown resistors 43, 45, and 47 as having specific resistances of 13,000 ohms, 13,000 ohms, and 9100 ohms. In this specific form of the element 34 we apply a positive potential of twenty volts to the resistor 47. With "0's," to which ground potential corresponds, applied to both resistors 43 and 45, it will be apparent that base 35 is at a potential above ground with the result that the element 34 will not conduct. With a "1" represented by a negative potential of twenty volts applied to only one of the resistors 43 and 45, conventional circuit analysis shows that the base 35 remains slightly above ground potential with the result that no conduction takes place through the element 34. With "1's" represented by negative twenty volt potentials applied to both resistors 43 and 45, base 35 is below ground potential with the result that the transistor conducts and collector 41 is substantially connected to ground through the transistor. From the foregoing, it will be seen that the transistor contained in component 34 functions in the manner analogous to that of a switch which is normally open and which closes when, and only when, "1's" are applied to both the resistors 43 and 45. This circuit component may be designated as a "two-input AND" component which conducts only when inputs of prescribed magnitude are present on both its input terminals.

As has been explained hereinabove, we apply the most significant digital bits and the complements thereof of the numbers A and B to the control input terminals of the components 34, 36, 38, and 40 in a predetermined manner. For purposes of clarity, we have designated below the control input terminals the digits or complements applied to these terminals. It will be apparent from the drawing that the respective components 34, 36, 38, and 40 are activated by the inputs A and B', A and B, A' and B', and A' and B. We have also indicated within the blocks representing the components the significance of the digits of the binary representations which control the components. For example, each of the components 34, 36, 38, and 40 is controlled by the most significant digits, $A_{12}$ and $B_{12}$, or their complements, of the binary representations. It will be seen that if, for example, no difference exists in the most significant digits and both are "1's," element 36 is rendered conductive effectively to connect its output terminal to ground.

We connect the output terminal of the element 34 to the input terminal of a gate component which we have designated for purposes of clarity by the reference character 11a enclosed within the block representing the element. We connect the output terminal of a two-input OR circuit 11b to the control input terminal of component 11a. This component 11a and others of a similar nature described hereinafter are rendered conductive by a signal applied to the control terminal to pass a signal applied to the input terminal. In view of this operation we have termed them "gate components." The input terminals of element 11b are controlled by the eleventh least significant digits and the complements thereof of the respective representations. As will be explained hereinafter, if either of the input terminals of the element 11b carries a potential representing a "1" the element 11b renders the component 11a conductive.

Referring again to FIGURE 4, we have shown the details of the logic circuit components 11a and 11b. As can be seen by reference to FIGURE 4, the gate component 11a is made up of a transistor having a base 48, an emitter 50, and a collector 52, while the component 11b represents the base circuit of the transistor, including respective resistors 54, 56, and 58, one terminal of each of which is connected to the base 48. Let us assume for purposes of illustration that element 34 is conducting so that the emitter 50, which is connected to collector 40, is substantially at ground potential. Since the transistor of component 11a is a p-n-p transistor, in order for it to be rendered conductive, the base 48 must be brought below ground potential. In the specific example of the element 11b, we have shown the respective resistors 54, 56, and 58 as having resistances of 30,000 ohms, 30,000 ohms, and 80,000 ohms respectively. Further, by way of example, we have shown a bias of +20 volts as being applied to resistor 58. With this arrangement, it will be obvious that with "0's" applied to both resistors 54 and 56, base 48 will be above ground and the element 11a will not conduct. If, however, a potential of —20 volts representing a "1" is applied to either of resistors 54 or 56, the base 48 will be brought below ground and the element 11a conducts. As was the case with the element 34, this transistor circuit functions in a manner similar to that of a normally open switch. However, rather than requiring inputs to both its input terminals to be switched on, this arrangement requires an input to only one or the other of its input terminals to render the transistor conductive. In accordance with this operation of the transistor circuit, we have shown a two-input OR element arranged to activate a gate component in the representation of FIGURE 2.

We also connect the output of component 34 to the input terminal of a two-input AND component 11c, the control terminals of which are supplied with the representations of the $A'_{11}$ and $B_{11}$ digits. It is to be understood that the two-input AND circuit 11c, as well as the remainder of the two-input AND circuits to be described hereinafter, are similar in construction and operation to the component 34. For this reason they will not be described in detail. We connect the output terminals of the components 36 and 38 to a common conductor 60 connected to the respective input terminals of two-input AND circuits 11d, 11e, 11f, and 11g. We connect the output terminal of component 40 to the input terminals of a gate component 11h and a gate component 11i, the control input terminal of which is actuated by a two-input OR circuit 11j. It is to be understood that the elements 11i and 11j are similar in construction and operation to the elements 11a and 11b. As has been explained hereinabove, in connection with components such as the component 34, we have designated the digital bits or complements, the representations of which are fed to the control input terminals of the logic circuit components below these terminals in the drawings. The number enclosed in the block representing an element indicates the digits of the respective representations which activate the element. For example, component 11c is controlled by the complement $A'_{11}$ of the bit $A_{11}$ of the A number and by the $B_{11}$ bit of the B number. We have followed this notation throughout the remainder of our system to be described hereinafter.

Our comparator and converter includes a plurality of respective gate components 11a to 5a, the control terminals of which are fed by respective two-input OR circuits 11b to 5b, to the control terminals of which we feed the representations of the respective pairs of bits and complements $A_{10}B'_{10}$ to $A_5B'_5$. We connect the output terminals of the components 11a through 5a to a common conductor 62.

Our comparator includes a number of respective two-input AND circuit components 10c to 5c connected in series between the output terminal of component 11c and a common conductor 64. We connect the respective output terminals of the components 11c to 6c to the input terminals of components 10a to 5a. The respective logic circuit components 11c to 5c are controlled by the representations of the respective pairs of digits and complements $A'_{11}B_{11}$ to $A'_5B_5$. A plurality of respective two-input AND components 10d to 5d are controlled by the representations of the respective pairs of digits and complements $A_{10}B'_{10}$ to $A_5B'_5$. We connect the output terminals of the respective components 11d to 6d to the input terminals of components 10c to 5c. We connect the output terminal of component 5d to conductor 64.

A plurality of two-input AND circuit components 11e to 5e connected in series between conductor 60 of component 38 and a conductor 66 have control signal terminals to which we feed the respective pairs of bits $A_{11}B_{11}$ to $A_5B_5$. Another plurality of two-input AND circuits 11f to 5f connected in series between conductor 60 and conductor 66 have control input terminals to which we apply the representations of the respective pairs of complements $A'_{11}B'_{11}$ to $A'_5B'_5$. A plurality of two-input AND circuits 11g to 5g have control input terminals to which we apply the respective representations of the pairs of bits and complements $A'_{11}B_{11}$ to $A'_5B_5$. Conductor 60 connects the output terminals of components 36 and 38 to the input terminals of the components 11d to 11g. Similarly, we connect the output terminals of each pair of components from the pair including 11e and 11f to the pair including 6e and 6f to the input terminals of the respective succeeding groups from the group including components 10d to 10g to the group including the components 5d to 5g.

We connect a plurality of two-input AND elements 10h to 5h in series between the output terminal of component 11h and a conductor 68. We control the elements 11h to 5h from the representations of the respective pairs of bits and complements $A_{11}B'_{11}$ to $A_5B'_5$. We connect the respective output terminals of the components 11g to 6g to the respective input terminals of the elements 10h to 5h. We connect the output terminal of element 5g to the conductor 68. We connect the respective output terminals of a plurality of gate circuits 11i to 5i to a common conductor 70. The respective elements 11i to 5i are controlled by the outputs of a number of two-input OR circuits 11j to 5j, to the control terminals of which we apply the representations of the respective pairs of complements and bits $A'_{11}B_{11}$ to $A'_5B_5$. We connect the respective output terminals of components 11h to 6h to the input terminals of elements 10i to 5i.

The conductor 64 connects the output terminals of components 5c and 5d to the input terminals of a plurality of two-input AND elements 4a to 4d. Similarly, conductor 66 connects the output terminals of the circuits 5e and 5f to the input terminals of a plurality of respective two-input AND components 4e to 4h. Conductor 68 connects the output terminals of components 5g and 5h to the input terminals of a plurality of respective two-input AND circuits 4i to 4l. We control the elements 4a to 4l from the representations of the bits and complements in such a manner that one of each of the group of four elements 4a to 4d, 4e to 4h, and 4i to 4l is rendered conductive at all times. For example, the group of respective elements 4a to 4d are controlled by the respective representations of the pairs of bits and complements $A_4B'_4$, $A_4B_4$, $A'_4B'_4$, and $A'_4B_4$. It will be seen that all combinations of bits and complements of the fifth least significant digit are provided for each of the groups of elements 4a to 4d, 4e to 4h, and 4i to 4l.

We connect the conductor 62 and the output terminal of element 4a to a conductor 72. We connect the output terminals of elements 4b and 4c to a conductor 74. The output terminals of elements 4d and 4e are connected to a conductor 76, while the output terminals of elements 4f and 4g are connected to a conductor 78. We connect the output terminals of elements 4h and 4i to a conductor 80 and connect the output terminals of components 4j and 4k to a conductor 82. We connect the output terminal of component 4l and the conductor 70 to a conductor 84.

Arbitrarily we have designated a difference in which the number A is less than the number B as a minus difference and a difference in which the number A is greater than the number B as a plus difference. As has been explained hereinabove, the difference between A and B above a difference of ±16 is designated as D. If A is greater than B and the difference occurs in digits above the $A_5$ and $B_5$ digits, the difference between the numbers is greater than plus 32 and $D > +2$. If the difference occurs in the sixth least significant digit, then $D = +2$ if $A > B$ and $D = -2$ if $A < B$. Similarly, if the difference occurs in the fifth least significant digit, then $D = \pm 1$. If the difference in the numbers occurs only in the four least significant digits, then $D = 0$. It is to be noted, as will be explained hereinafter, that even where an indication is obtained, such that D has a value other than zero, the actual difference between the numbers may be something more or less than the indicated value of D, owing to a difference in the four least significant digits of the number. It will be remembered, of course, that proportional control is required only in the range of from $D = +32$ to $D = -32$.

From the arrangement of our logic circuit components thus far described, it will be seen that if there is no difference in the portions of the numbers $A_D$ and $B_D$ containing the higher order digits, so that the digits $A_{12}$ to $A_4$ are the same as the digits $B_{12}$ to $B_4$, a circuit is complete through certain of the components 36 and 38, 11e to 5e, 11f to 5f, and 4f and 4g to conductor 78, which may be designated the $D=0$ conductor. In other words, the difference between the numbers then is between +16 and −16.

As will be explained in detail hereinafter, owing to the arrangement of our logic circuit components, if a difference of higher order digits occurs such that $D > +2$ or $D < -2$, either of the respective conductors 72 or 84 is connected to ground conductor 32. If the difference $D = +2$, conductor 74 is connected to ground conductor 32 through the components. If the difference $D = -2$, conductor 82 is connected to ground conductor 32. Differences of +1 and −1, respectively, cause conductors 76 and 80 to be connected to conductor 32.

Our comparator includes a transformer, indicated generally by the reference character 86, having a primary winding 88 provided with a center tap 90 and a secondary winding 92. We connect the secondary winding 94 of a transformer indicated generally by the reference character 96 between the center tap 90 and a terminal 98 of a source of negative potential which has a magnitude of, for example, ten volts. We apply a varying signal to the primary winding 100 of a transformer 96. This signal may, for example, be a 115 volt 60 cycle signal. The transformer 96 steps this voltage down to produce a sinusoidal voltage having a peak-to-peak swing of from 0 volts to −20 volts at the center tap 90. We connect resistances of predetermined values into the circuits of the respective upper and lower halves of winding 88, as viewed in FIGURE 2, to produce a net flux which is the analogue of the difference between the numbers A and B over the range of difference of ±32 and a constant flux outside this range.

We connect a resistor 102 between one end terminal of winding 88 and the input terminal of a gate component 104, the output terminal of which is connected to the terminal 106 of a source of negative potential having a magnitude of, for example, twenty volts. A two-input OR component 108 has an output terminal connected to the control terminal of element 104. We connect the respective conductors 72 and 74 to the control input terminals of element 108. We also connect the input terminals of element 108 to respective terminals 110 and 112 providing a negative biasing potential of, for example, twenty volts. As has been explained hereinabove if a difference D greater than +2 exists, a circuit is complete through the logic circuit components from ground conductor 32 to conductor 72. Similarly, if a difference $D = +2$ exists, conductor 74 is connected to ground through the logic circuit components. If either of the two conditions described above occurs, the bias potential on one of the input terminals of element 108 is grounded and this element is activated to cause the component 104 to conduct. In this manner a circuit is complete from center tap 90 through the upper half of primary winding 88, through resistor 102 and through the element 104 to terminal 106 to cause a current flow through the upper half of primary winding 88. As will be explained hereinafter, resistor 102 has a value providing a current flow having a magnitude which is the analogue of a difference in the numbers of 32. Since this current flows upwardly through the primary winding, it induces a voltage in winding 92 of a polarity representing an error in the plus direction.

Referring now to FIGURE 5, in which we have shown the details of the elements 104 and 108, the element 104 includes a transistor of the n-p-n type having a collector 114, an emitter 116, and a base 118, we connect resistor 102 between winding 88 and the collector 114, the terminal of which forms the output terminal of our element 104. As is known in the art, in order for an n-p-n transistor to conduct, its base potential must be above the potential of the emitter. Since emitter 114 is connected to a source of negative potential of twenty volts, it is necessary that the base 118 be at a potential above −20 volts for the transistor to conduct. A diode 120 which may be a semi-conductor or vacuum diode or other device with rectifying properties and a resistor 122, each have one terminal connected to the terminal 110. The other respective terminals of these elements are connected to sources of negative potential of twenty and forty volts respectively. As a result of these connections, a negative bias potential of twenty volts exists at terminal 110. We connect a respective diode 124 and a resistor 126 between terminal 112 and respective sources of negative bias potential of twenty and forty volts to produce a negative bias potential of twenty volts at terminal 112. As has been explained hereinabove, the respective conductors 72 and 74 connected to the input terminals of component 108 to which terminals 110 and 112 are connected are adapted to be connected to ground through our logic circuitry to remove the bias potentials from terminals 110 and 112. We have indicated the logic circuitry between the respective conductors 72 and 74 and ground conductor 32 in FIGURE 5 by respective broken-line blocks 128 and 130.

We connect three resistors 133, 135, and 137 between base 118 and the respective terminals 110, 112, and the terminal 139 of a source of negative potential which may, for example, be forty volts. We so select the resistances of resistors 133, 135, and 137 such that, if the bias is removed from either of the terminals 110 and 112, the potential of base 118 will be above −20 volts to render the transistor conductive. In one embodiment of the element 108 the resistors 133, 135, and 137 may have respective values of 7,500 ohms, 7,500 ohms, and 82,000 ohms. With these values of resistance and the biases as shown, conventional circuit analysis demonstrates that the transistor of component 104 will conduct if either of the conductors 72 or 74 is connected to ground to remove the bias from one of the terminals 110 or 112.

From the foregoing it will be seen that if $D=+2$, one or the other of conductors 72 and 74 will be connected to ground with the result that component 104 is rendered conductive to connect resistor 102 into the circuit of the upper half of primary winding 88.

We connect the two conductors 82 and 84 to the input terminals of a two-input OR circuit element 132 which is adapted to render a gate element 134 conductive when either of its input terminals is connected to ground. We also connect the input terminals of element 132 to respective terminals 136 and 138. Terminals 136 and 138 are connected in a reverse-biased sense through diodes to a source of minus twenty volts exactly as are terminals 110 and 112. We connect a resistor 140 having a resistance value equal to the value of the resistor 102 between the terminal of the lower half of winding 88 and the input terminal of component 134. We connect the output terminal of the element 134 to a terminal 142 of a source of negative potential having a magnitude of, for example, twenty volts. The elements 132 and 134 are similar in construction to the elements 108 and 104. As has been explained hereinabove, when the difference $D=-2$, one or the other of the conductors 82 and 84 is connected to ground to cause element 134 to conduct. When this occurs, a series circuit is complete from secondary winding 94, through the lower half of winding 88, through resistor 140 and through element 134 to terminal 142. This circuit provides a path for current to flow from the center tap 90 through the lower half of winding 88. Since the resistance of resistor 140 is equal to that of resistor 102, this current is equal in magnitude to the current flow when resistor 102 is connected in the circuit of the upper half of winding 88. It will be appreciated that current flow through the upper half of winding 88 is in the opposite direction to current flow through the lower half of winding 88 with the result that voltages of opposite polarity are produced in secondary winding 92 by these respective currents.

We connect the conductor 76 to the control terminal of a gate component 144 to render this component conductive when conductor 76 is connected to ground. As has been explained hereinabove, conductor 76 is grounded when $D=+1$ corresponding to an actual difference of 16 in the numbers A and B. We connect a terminal 146 through a reverse-biased diode to a source of negative biasing potential of a magnitude of, for example, twenty volts exactly as was done for either terminal 110 or terminal 112. We connect terminal 146 to conductor 76 leading to the control terminal of element 144 normally to render the element nonconducting. The details of construction of the element 144 are similar to those of the two elements 104 and 108 shown in FIGURE 5 with the exception that one of the resistors 132 and 134 and its associated biasing circuit is omitted with the result that no OR logic function is performed in element 144. We connect a resistor 148 between the terminal of the upper half of winding 88 and the input terminal of element 144 and connect the output terminal of element 144 to the terminal 150 of a source of negative potential having a magnitude of, for example, twenty volts. When element 144 conducts, resistor 148 is in the circuit of the upper half of winding 88. We select the magnitude of resistor 148 to be substantially twice that of resistor 102 so that with only resistor 148 in the circuit, the magnitude of the current flow is half the magnitude of the current flow with resistor 102 in the circuit.

We connect the conductor 80 which is grounded when $D=-1$ to the control terminal of a gate component 150 which terminal also is connected to a terminal 152. We connect terminal 152 through a reverse-biased diode to a source of a negative biasing potential of, for example, twenty volts in the same manner as terminals 110 and 112. When $D=-1$, corresponding to an actual difference of a magnitude of 16 with $A_DB_D$ element 150 conducts to connect its input terminal to the terminal 154 of a source of negative potential having a magnitude of twenty volts. We connect a resistor 155 having a resistance substantially equal to that of resistor 148 between the terminal of the lower half of winding 88 and the input terminal of element 150. It will be seen that when $D=-1$, resistor 155 is connected in the circuit of the lower half of winding 88.

We connect a number of respective resistors 156, 158, 160, and 162 between the terminal of the upper half of winding 88 and the respective ON input terminals of the number of ON-OFF logic circuit components $3a$ to $0a$. Respective two-input OR logic circuit components $3b$ to $0b$ have output terminals connected to the OFF control terminals of the components $3a$ to $0a$. We feed the representations of the pairs of bits and complements $A'_3B'_3$ to $A'_0B'_0$ to the control terminals of components $3b$ to $0b$. The arrangement of these elements is such that a negative potential of twenty volts applied to either control terminal of a component such as OR circuit $3b$ turns off the normally conducting element such as $3a$. We connect the respective output terminals of the elements $3a$ to $0a$ to a common conductor 164 adapted to be connected to a negative potential of twenty volts in a manner to be described hereinafter. It will be seen that with conductor 164 connected to a negative potential of twenty volts and with the components $3a$ to $0a$ in their normally ON state resistors 156, 158, 160, and 162 are connected in parallel between the terminal of the upper half of winding 88 and the minus twenty volt potential.

Referring now to FIGURE 3, we have shown the details of one of the components $3a$ to $0a$ such, for example, as the component $2a$ and its associated OR circuit $2b$. Component $2a$ includes an n-p-n transistor having a collector 166, an emitter 168, and a base 170. In FIGURE 3 we have indicated the auxiliary logic circuitry for connecting conductor 164 to a terminal such as the terminal 172 of a source of negative twenty volt potential schematically by the broken line block 174. We connect respective resistors 176 and 178 between the base 170 of the transistor of element $2a$ and the control input terminals of the element $2b$. We connect a resistor 180 between the base 170 and a terminal 182 of a source of negative biasing potential having a magnitude of forty volts in the specific form of the circuit component shown. A first circuit includes a crystal diode 184 and a resistor 186, each of which has one terminal connected to one of the control terminals of element 2b. Diode 184 and resistor 186 have their other terminals respectively connected to ground and to a positive potential of twenty volts to clamp the input terminal of element 2b, to which the diode and resistor are connected to ground. A similar circuit including a crystal 188 and a resistor 190 clamps the other input terminal of this circuit to ground. It is to be understood that the control input terminals remaining of all the rest of our logic circuit components to which representations of digital inputs are fed may be clamped to ground by similar circuits. We select the respective values of resistors 176, 178, and 180 such that with the bias shown, the base 170 will be at a potential above twenty volts with resistors 176 and 178 at ground potential corresponding to a "0" in the binary code. With the base 170 at a potential above minus twenty volts, the element 2a conducts to connect resistor 158 in the circuit of the upper half of winding 88. If the resistors 176, 178, and 180 have respective values of, for example, 16,000 ohms, 16,000 ohms, and 11,000 ohms and if a potential of minus twenty volts representing a "1" in the binary code is applied to either of the resistors 176 and 178, the potential of base 170 drops below minus twenty volts with the result that element 2a stops conducting. The remaining components 3a, 1a, and 0a function in a manner similar to that outlined in connection with component 2a.

Referring again to FIGURE 2, we connect respective resistors 192, 194, 196, and 198 between the terminal of the lower half of winding 88 and the respective ON input terminals of respective ON-OFF logic circuit components 3c to 0c. The output terminals of elements 3c to 0c are connected to conductor 164 which, as is explained hereinabove, is connected to the terminal 172 of a source of negative potential through auxiliary logic circuitry in a manner to be described. The output terminals of respective two-input OR logic circuit components 3d to 0d are connected to the OFF terminals of the respective components 3c to 0c. We apply the representations of the pairs of bits and complements $A_3B'_3$ to $A_0B'_0$ to the respective input terminals of the elements 3d to 0d. The components 3c to 0c and 3d to 0d are the same in construction details as are the respective components 3a to 0a and 3b to 0b. Further resistors 192, 194, 196, and 198 have the same respective resistance values as do the resistors 156, 158, 160, and 162.

As has been explained hereinabove, in the form of our invention shown we desire proportional control only when the difference between the numbers A and B is within the range from +32 to −32. The resistors 156, 158, 160, 162, 192, 194, 196, and 198 have values to provide proportional control in either a straight binary system or in a decimal binary coded system as will be explained hereinafter. Since we desire proportional control when, and only when, the difference is between +32 and −32, we disable the logic circuits of the resistors providing proportional control when such control is not desired. In order that conductor 164 be connected to the terminal 172 to permit the proportional control resistors to be placed in the circuit, one of a number of respective logic circuit components, 200, 202, or 204, must be rendered conductive. Each of the components 202 and 204 has a pair of control input terminals which are normally biased to render the element non-conductive. These components are of the same general nature in detail as those described hereinabove. Their construction is such that in order for them to be rendered conductive, both their input terminals must be connected to ground. The component 200, together with its control component 206, is analagous to the component 104 with its control component 108. We connect the input terminals of the elements 200, 202 and 204 to conductor 164 and connect the output terminals of these components to terminal 172. The element 200 is a gate circuit which is nonconductive unless its control input terminal, which is supplied by a three-input OR circuit 206, is connected to ground. Respective conductors 208, 210, and 212 connect the control input terminals of element 206 to the respective conductors 76, 78, and 80. Thus, when any one of the conductors 76, 78, and 80 corresponding respectively to $D=+1$, $D=0$, and $D=-1$ is connected to ground through the logic circuitry of the higher significance digits, component 206 causes element 200 to conduct to connect conductor 164 to terminal 172 to permit the proportional control resistors to be connected into the circuit. It will be appreciated that with the values of D corresponding to the conductors 76, 78, and 80, proportional control is obtained in our system.

There are two other cases in which we desire to provide proportional control. The first of these is where $D=-2$ and $A_x>B_x$ so that the actual difference is less than 32 in the negative direction. The second of these cases occurs where $D=+2$ and $A_x<B_x$ so that the actual difference is less than 32 in the plus direction. It will be appreciated that in order to account for these situations, we must produce an indication of $A_x>B_x$ and of $A_x<B_x$.

We connect the input terminals of a number of two-input AND components 3e to 3h to a ground conductor 214. We connect component 3f in series with components 2f to 0f between conductor 214 and the terminal 216 which is connected through a reverse-biased diode to a source of negative potential having a magnitude of about twenty volts. We connect component 3g in series with components 2g to 0g between conductor 214 and terminal 216. Our comparator includes two-input AND components, 2e to 0e, the output terminals of which, together with the output terminal of component 3e, are connected to a conductor 218. We connect the terminal 220 through a reverse-biased diode to a source of negative twenty volt bias potential and to conductor 218. Our comparator includes components 2h to 0h, the output terminals of which, together with the output terminal of component 3h, we connect to a conductor 222 to which we connect the terminal 224 which is connected through a reverse-biased diode to a source of minus twenty volts bias potential. We connect the output terminals of the respective pairs of components from the pair including 3f and 3g to the pair including 1f and 1g to the input terminals of the respective succeeding groups of components from the group including 2e to 2h to the group including 0e to 0h. We apply the representations of the respective pairs of bits and complements from $A_3B'_3$ to $A_0B'_0$ to the pairs of control input terminals of the respective components 3e to 0e. We apply the representations of the pairs of bits $A_3B_3$ to $A_0B_0$ respectively to the pairs of control input terminals of components 3f to 0f. We apply the representations of the pairs of complements from $A'_3B'_3$, $A'_0B'_0$ respectively to the control input terminals of components 3g to 0g. We apply the representations of the respective pairs of bits and complements from $A'_3B_3$ to $A'_0B_0$ to the pairs of control input terminals of components 3h to 0h.

From the foregoing it will be seen that if $A_x=B_x$, the bias on terminal 216 will be grounded and a conductor 226 connected to this terminal will be at ground potential. If $A_x>B_x$, the bias on terminal 220 will be grounded and conductor 218 will be at ground potential. Similarly, if $A_x<B_x$, the bias on terminal 224 will be grounded and conductor 222 will be at ground potential.

We connect a conductor 228 between the conductor 82 corresponding to $D=-2$ and one control terminal of component 202, the other control terminal of which we connect to conductor 218. Thus, with $D=-2$ and $A_x>B_x$ component 202 conducts to provide proportional control where the actual difference is less than two in a negative direction. A conductor 230 connects the conductor 74 corresponding to $D=+2$ to one terminal of logic element 204 to the other terminal of which we connect conductor 222. Thus, with $D=+2$ and $A_x<B_x$ so that the actual difference is less than 32 in a positive direction element 204 conducts to provide proportional control.

We connect the conductor 78 corresponding to $D=0$ and the conductor 226 corresponding to $A_x=B_x$ to the control terminals of a two-input AND logic element 232. We connect a terminal 234 through a reverse-biased diode to a source of negative biasing potential of twenty volts, to conductor 78 normally to bias the associated control input terminal of element 232 off. When both conductors 78 and 226 are at ground potential indicating that $D=0$ and $A_x=B_x$ so that the numbers A and B coincide, component 232 conducts to connect its input terminal to the terminal 236 of a source of negative potential of a magnitude of about twenty volts. This coincidence indicating circuit may be used to operate any suitable type of indicator or control device.

As has been explained hereinabove, in the form of our system shown we require proportional control in the range of differences from $+32$ to $-32$. Outside of this range either resistor 102 is connected in the circuit of the upper half of winding 88 or resistor 140 is connected in the circuit of the lower half of winding 88. In either case a constant control in the proper direction is generated. Within the range in which proportional control is required where the difference $D=+2$ and $A_x<B_x$, where $D=-2$ and $A_x>B_x$, where $D=\pm1$ and $A_x\neq B_x$ and where $D=0$ and $A_x\neq B_x$ certain of the resistors 156, 158, 160, and 162 are connected in the circuit of the upper half of winding 88 and certain of the resistors 192, 194, 196, and 198 are connected in the lower half of the winding 188 to provide a net flux in the transformer 86 which is the analogue of the required control signal.

Referring to FIGURE 7 we have shown a graph of the output signal versus the error for the form of our comparator and converter shown in FIGURE 2. We have indicated respective points on this graph by the respective reference characters $a$ to $o$. For purposes of convenience, we have shown the resistances connected in the circuits of the halves of winding 88 to give the required correction for these various points in Table I below.

produce a secondary winding voltage which is the analogue of the difference between the numbers. Where our comparator is used, in a straight binary system the respective resistors 102, 148, 156, 158, 160, and 162, adapted to be connected into the circuit of the upper half of winding 88, are weighted to produce respective currents having peak to peak values of substantially 32, 16, 8, 4, 2, and 1 milliamperes in the upper half of winding 88. The resistors connected in the circuits of the lower half of winding 88 are weighted to produce the same respective currents through the lower half of the winding. In the specific form of our comparator and converter shown, in which a signal having a swing of twenty volts is applied to the center tap 90, the resistors connected in the circuit of the upper half of winding 88 have resistances in order of significance from the most significant to the least significant of 620 ohms, 1.2 kilohms, 2.4 kilohms, 5.1 kilohms, 10 kilohms, and 20 kilohms. The resistors connected in the circuit of the lower half of winding 88 have the same respective resistance values.

We may select the values of the resistors in the respective halves of winding 88 to permit our comparator and converter to be used in a binary coded decimal system and in an excess three coded decimal system. We accomplish this result by changing the weights of the resistors in the circuits of the halves of winding 88 from 1, 2, 4, 8, 16 and 32 to 1, 2, 4, 8, 10, and 20. This change in the weights of the resistors can be accomplished by changing the 620 ohm resistors 102 and 140 to one kilohm resistors and by changing the 1.20 kilohm resistors 148 and 156 to two kilohm resistors. With this change the output signal versus error will be as is shown in the graph of FIGURE 8. It will be apparent from the figure that $D=\pm1$ in this form of our comparator and converter corresponds to an actual difference of $\pm10$ rather than $\pm16$ and $D=\pm2$ correpsonds to an actual difference of $\pm20$ rather than $\pm32$. Some changes in the high-order difference logic, within the scope of our invention, are of course required to give the proper significance to the terms $D=\pm1$. It will be seen that in this form of our comparator and converter proportional control is provided over the range of dif-

TABLE I

| No. | Digits | | | Condition | Curve Point | Circuits to Resistor Components | Resistors | |
|---|---|---|---|---|---|---|---|---|
| | $A_D$ and $B_D$ | $A_x$ and $B_x$ | | | | | Upper | Lower |
| | 12 11 10 9 8 7 6 5 4 | 3 2 1 0 | | | | | | |
| A | 1 1 1 1 1 0 1 1 | 1 1 1 1 | $D<-2$ | $a$ | 36, 11e to 7e, 6g, 5i to 84 | | 140 |
| B | 1 1 1 1 1 1 1 1 | 1 1 1 1 | | | | | |
| A | 1 1 1 1 1 0 1 1 | 0 1 1 | $D=-2$ | $a$ | 36, 11e to 6e, 5g, 4k to 82 and 228; 3f and 2h to 222. | | 140 |
| B | 1 1 1 1 1 1 1 1 | 1 1 1 1 | $A_x<B_x$ | | | | |
| A | 1 1 1 1 1 1 0 1 | 1 1 1 1 | $D=-2$ | $b$ | 36, 11e to 6e, 5g, 4k to 82 and 228 | | 140 |
| B | 1 1 1 1 1 1 1 1 | 1 1 1 1 | $A_x=B_x$ | | | | |
| A | 1 1 1 1 1 0 1 1 | 1 1 1 1 | $D=-2$ | $c$ | 36, 11e to 6e, 5g, 4k to 82 and 228, 3f and 2e to 218. | 158 | 140 |
| B | 1 1 1 1 1 1 1 1 | 0 1 1 | $A_x>B_x$ | | | | |
| A | 1 1 1 1 1 1 1 1 | 0 1 1 | $D=-1$ | $d$ | 36, 11e to 5e, 4h to 80 and 212 | 160 | 155,194 |
| B | 1 1 1 1 1 1 1 1 | 1 0 1 | $A_x<B_x$ | | | | |
| A | 1 1 1 1 1 0 1 1 | 1 1 1 1 | $D=-1$ | $e$ | 36, 11e to 5e, 4h to 80 and 212 | | 155 |
| B | 1 1 1 1 1 1 1 1 | 1 1 1 1 | $A_x=B_x$ | | | | |
| A | 1 1 1 1 1 1 0 1 | 1 1 1 | $D=-1$ | $f$ | 36, 11e to 5e, 4h to 80 and 212 | 158 | 155 |
| B | 1 1 1 1 1 1 1 1 | 0 1 1 | $A_x>B_x$ | | | | |
| A | 1 1 1 1 1 1 1 0 | 1 1 1 | $D=0$ | $g$ | 36, 11e to 5e, 4f to 78 and 210 | | 192 |
| B | 1 1 1 1 1 1 1 1 | 1 1 1 | $A_x<B_x$ | | | | |
| A | 1 1 1 1 1 1 1 1 | 1 1 1 | $D=0$ | $h$ | 36, 11e to 5e, 4f to 78 and 210; 3f to 0f to 226. | | |
| B | 1 1 1 1 1 1 1 1 | 1 1 1 1 | $A_x=B_x$ | | | | |
| A | 1 1 1 1 1 1 1 1 | 0 1 1 | $D=0$ | $i$ | 36, 11e to 5e, 4f to 78 and 210 | 156 | |
| B | 1 1 1 1 1 1 1 1 | 1 0 1 | $A_x>B_x$ | | | | |
| A | 1 1 1 1 1 1 0 1 | 1 0 1 | $D=+1$ | $j$ | 36, 11e to 5e, 4e to 76 and 208 | 148, 162 | 194 |
| B | 1 1 1 1 1 1 0 1 | 1 1 0 | $A_x<B_x$ | | | | |
| A | 1 1 1 1 1 1 0 1 | 1 1 1 | $D=+1$ | $k$ | 36, 11e to 5e, 4e to 76 and 208 | 148 | |
| B | 1 1 1 1 1 1 0 1 | 1 1 1 | $A_x=B_x$ | | | | |
| A | 1 1 1 1 1 1 0 1 | 1 1 1 | $D=+1$ | $l$ | 36, 11e to 5e, 4e to 76 and 208 | 148, 158 | |
| B | 1 1 1 1 1 1 0 1 | 0 1 1 | $A_x>B_x$ | | | | |
| A | 1 1 1 1 1 0 1 0 | 0 1 1 | $D=+2$ | $m$ | 36, 11e to 6e, 5d and 4b to 74 and 230; 3f and 2h to 222. | 102 | 194 |
| B | 1 1 1 1 1 0 1 1 | 1 1 1 | $A_x<B_x$ | | | | |
| A | 1 1 1 1 1 0 1 1 | 1 1 1 | $D=+2$ | $n$ | 36, 11e to 6e, 5d and 4b to 74 and 230. | 102 | |
| B | 1 1 1 1 1 0 1 1 | 0 1 1 | $A_x=B_x$ | | | | |
| A | 1 1 1 1 1 0 1 1 | 1 0 1 | $D=+2$ | $o$ | 36, 11e to 6e, 5d and 4b to 74 and 230. | 102 | |
| B | 1 1 1 1 1 0 1 1 | 0 1 1 | $A_x>B_x$ | | | | |
| A | 1 1 1 1 1 1 1 1 | 1 1 1 | $D>+2$ | $o$ | 36, 11e to 7e, 6d and 5a to 62 and 72 | 102 | |
| B | 1 1 1 1 0 1 1 1 | 1 1 1 | | | | | |

As has been explained hereinabove, we select the values of the resistors of our comparator to produce the required current flow in the halves of primary winding 88 to ferences from $+20$ to $-20$. In this form of our comparator combinations of currents corresponding to the four least significant digits which total more than nine milliamperes are not permitted. This system works for the excess three coded decimal system since excess currents cause fluxes which cancel in the output transformer 86.

We have provided a further form of our comparator and converter which may be used to cause a positional servomechanism to overshoot when approaching the zero difference position in one direction and not to overshoot when approaching the desired position from the other direction. By way of example, if the system is to have proportional control on only the positive difference side where $A>B$, the circuit of FIGURE 2 may be modified as is shown in FIGURE 6 to porvide an overshoot in one direction. It will be seen that in this form of our comparator on the negative difference side where $B>A$, we employ only the resistor 140 and provide no proportional control on the negative difference side. On the positive difference side this system provides proportional control up to $D=+2$. Structurally in this form of our comparator and converter we eliminate the resistor 155 and its associated component 150. We also connect the output terminals of the components $3a$ to $0a$ and $3c$ to $0c$ to the terminal 172 only for the cases where $D=0$ and $A_x>B_x$, where $D=+1$ and where $D=+2$ and $A_x<B_x$. We accomplished this by connecting the conductor 164 to the input terminals of a two-input AND component 238, and component 240 and a two-input AND component 242, the output terminal of each of which components we connect to terminal 172. We connect the respective conductors 210 and 218 corresponding respectively to the conditions $D=0$ and $A_x>B_x$ to the control input terminals of component 238 to cause this component to connect conductor 164 to terminal 172 when both these conditions exist. We connect the control input terminal of component 240 to the conductor 208 corresponding to the condition $D=+1$. We connect the control input terminals of component 242 to the conductors 230 and 222 corresponding to the conditions $D=2$ and $A_x<B_x$. It will be seen that with these connections to the control terminals of components 238, 240, and 242 the components corresponding to the four least significant digits are connected to the terminal 172 when the actual difference is positive up to an actual difference of $+32$ or $+20$, depending upon whether a straight binary system or a coded decimal system is being used. The components 108, 104 and 144 function in the same manner as in a system in which overshoot is permitted as in FIGURE 2.

We control the component 134 from a four-input OR component 244 to connect the resistor 140 to terminal 142 whenever the error is on the negative side. We connect the respective control input terminals of component 244 to conductor 84, to conductor 82, to conductor 212, and to the output terminal of a two-input AND component 246, the control input terminals of which are connected to the respective conductors 210 and 222. It will be seen that with these connections resistor 140 will be connected to terminal 142 for the respective conditions where $D<-2$, where $D=-2$, where $D=-1$, and where $D=0$ and $A_x<B_x$. In other words, the maximum signal is generated for all negative differences.

Where a straight binary system is used, the form of our comparator shown in FIGURE 6 follows the graph of FIGURE 7 described in connection with the form of our comparator shown in FIGURE 2 for all positive differences. For all negative differences, however, the form of our comparator shown in FIGURE 6 follows the line 248 to provide maximum output for all negative differences. The conditions for which the comparator of FIGURE 6 follows the line 248 are indicated in the figure below the line separating positive and negative control signals. Where the comparator of FIGURE 6 is used in a coded decimal system, it follows the same portion of the graph of FIGURE 8 on the positive difference side as does the system of FIGURE 2 and follows a line 250 on the negative difference side to give the maximum control signal for all negative differences. We have indicated the conditions for which the system of FIGURE 6 follows the line 250 in FIGURE 8 below the line of zero control signal in FIGURE 8.

In operation of the form of our comparator and converter shown in FIGURE 2 in a system such, for example, as is shown in FIGURE 1 we apply the binary bits and complements of the representation from the storage register 26 to the control input terminals of the logic circuit components of our device in the manner shown in FIGURE 2. As has been explained hereinabove, the components designated by a reference character including a number from 0 to 12 have the bit or complement of a corresponding significance fed thereto. For example, the components $9b$ to $9h$ and $9j$ have the bit or complement of tenth least significance fed thereto. We apply the bits and complements of the representation from the analogue-to digital converter 30 to control input terminals of the logic circuit components other than those to which the bits and complements from the storage register are fed. Bits and complements of corresponding significance are fed to a logic circuit component from the register 26 and from the converter 30. If the number represented by the output of storage register 26 is A and the number represented by the output of converter 30 is B, the component $9e$, for example, is actuated by the bits $A_9$ and $B_9$ as is shown in FIGURE 2. The other logic circuit components are actuated by bits or complements as is designated in FIGURE 2. If the actual difference between the numbers A and B is greater than 32 so that $D>+2$ or if the actual difference is less than $-32$ so that $D<-2$, then either of the resistors 102 or 140 is connected in the circuit of primary winding 88 to cause winding 92 to develop a signal having a magnitude of a certain level and a phase representing the direction of the difference. In between the values of actual difference of $+32$ and $-32$ proportional control is provided by the form of our comparator and converter shown in FIGURE 2. Within this range of difference the net flux in transformer 86 is the analogue of the difference between the binary representations of the numbers A and B. The graph of output versus difference is shown in FIGURE 7 and has been explained in connection with Table I hereinabove.

That the net flux owing to current flow through the primary winding 88 is proportional to the difference over the range of from $+32$ to $-32$ can readily be demonstrated by considering the following examples. Let us assume that $A = 1111111011111 = 8159$ and $B = 1111111111011 = 8187$ so that the actual difference $A-B=-28$. From Table I it is readily seen that for these numbers A and B resistor 140 is connected in the circuit of the lower half of winding 88 while resistor 158 is connected in the upper half of winding 88. For the respective resistance values 620 ohms and 5.1 kilohms given for resistors 140 and 158 hereinabove and assuming a signal having a swing of 20 volts applied to the center tap 90 it will be seen that a current flow having a magnitude of approximately 32 milliamperes flows downwardly through the lower half of winding 88 while a current having a magnitude of approximately four milliamperes flows upwardly through the upper half of winding 88. These currents produce a net flux in transformer 86 which corresponds to a current flow of 28 milliamperes downwardly through winding 88 to produce a signal in winding 92 which is the analogue of the actual error of $-28$.

By way of a second example, let us assume that $A = 1111111111111 = 8191$ and $B=1111111110100=8180$ so that the actual difference $A-B=+11$. With these two representations fed to our comparator and converter resistors 156, 160, and 162 are connected in parallel in the circuit of the upper half of winding 88. For the specific resistance values of 20 kilohms, 10 kilohms, and 2.4 kilohms given for the respective resistors 156, 160, and 162 hereinabove the total resistance connected in the circuit of the upper half of winding 88 is approximately 1.8 kilohms. With this value of resistance and a signal having a swing of from 0 to −20 volts applied to center tap 90 a current of approximately 11 milliamperes flows upwardly to the upper half of winding 88. With this current flow the secondary winding 92 develops a voltage which is the analogue of the error which in this case is +11. From these two examples it can be seen that for the specific values given in this example of our comparator and converter, the net flux in transformer 86 is that flux which would be produced by a net current flow in winding 88 having a magnitude proportional to the error and a direction representative of the direction of the error.

As has been explained hereinabove, our system may be modified to operate in a coded decimal system by changing the values of resistors 102, 148, 140, and 155, and by suitably modifying the high-order difference logic. Further, if it is desired to provide no overshoot in one direction of approach to the zero difference condition the form of comparator shown in FIGURE 2 may be modified in the manner shown in FIGURE 6 to prevent overshoot. We have shown output versus error or difference for a coded decimal system in FIGURE 8. Further, we have shown the respective lines 248 and 250 followed by a system which stops overshoot on the negative difference side for a straight binary converter and for a coded decimal converter respectively in FIGURES 7 and 8.

It is to be understood that the specific resistance values biasing signals and the like given hereinabove for the various circuit elements are by way of example only. Other particular values could, of course, be used to accomplish the same result.

For purposes of convenience we have described a form of our comparator and converter adapted to handle representations containing thirteen binary bits. One of the advantages of our system is that it may readily be expanded to handle a much larger number of bits. This is readily accomplished since units of our system can be manufactured as plug-in units. For example, the components 9a to 9j could be made in a single plug-in unit as well as other similar groups of components. Our comparator could readily be expanded to handle a greater number of digits merely by plugging in more units.

As also has been explained hereinabove, we have shown a form of our comparator and converter in which proportional control is provided over the range of differences from +32 to −32. It is to be understood that our system can be expanded to provide proportional control over a wider range if desired. This can be accomplished by using more units of the type including a and b components such as 2a and 2b and resistors of a magnitude inversely proportional to the significance of the digits which are to control the components. It is to be understood that while, in the specific form of our invention shown, we have disclosed transistors as switching elements and diodes as rectifying devices, we could as well use other switching elements such as relays or rotary switches or the like and could employ any suitable form of rectifying device.

It will be seen that we have accomplished the objects of our invention. We have provided a comparator and digital-to-analogue converter which produces a signal which is the analogue of the difference between a pair of binary digital representations over a given range of differences. Our system operates continuously and does not require sampling techniques such as have been suggested in the prior art. Our comparator and converter is relatively simple and inexpensive for the result achieved. Our system employs static logic components having no moving parts and is very reliable. Our system uses information in digital form and does not require auxiliary converting equipment. Our system may readily be expanded to handle a large number of binary bits. It may readily be modified to operate either in a straight binary system or in a coded decimal system.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A comparator for determining the difference between a first and a second digital representation in which the first representation has a plurality of digits in places of significance and in which the second digital representation has a plurality of digits in places of significance corresponding to the places of significance of the first representation digits including in combination means for producing a third digital representation equal to the difference between the first and second representations for every respective pair of first and second representation digits in like places of significance for which the digit of the first representation is greater than the digit of like significance of the second representation independently of differences between other pairs of respective first and second representation digits in like places of significance adjacent each pair in each instance in which the first representation digit exceeds the second representation digit, means for producing a fourth digital representation equal to the difference between the first and second representations for every respective pair of first and second representation digits in like places of significance for which the digit of the first representation is less than the digit of like significance of the second representation independently of differences between other pairs of respective first and second representation digits in like places of significance adjacent each pair in each instance in which the first representation digit is less than the second representation digit and means for determining the difference between the third and fourth digital representations.

2. A comparator as in claim 1 in which the means determining the difference between the third and fourth representations comprises means producing a first current proportional to the third representation and means producing a second current proportional to the fourth representation and means for determining the difference between the first and second currents.

3. A comparator as in claim 1 in which the means determining the difference between the third and fourth representation includes means producing a current proportional to the third representation, the current means comprising a number of circuits equal to the number of places of significance of the third representation, each circuit comprising a resistor of predetermined resistance value and a switching component and means serially connecting the resistor and the switching component and the current producing means also comprising means responsive to the third representation for actuating each switching component.

4. A comparator as in claim 1 in which the means determining the difference between the third and fourth representations includes means producing a current proportional to the third representation, the current means comprising a number of resistors equal to the number of places of significance of the third representation, each resistor corresponding to a place of significance and having a resistance value inversely proportional to the significance of the place, and the current producing means also comprising means responsive to the third representation for controlling the current through each resistor.

5. A comparator for determining the difference between a first and a second digital input representation in which the first representation has a plurality of digits in places of significance and in which the second digital representation has a plurality of digits in places of significance corresponding to the places of significance of the first representation digits for differences up to a certain limit difference represented by a certain difference between a digit of predetermined significance of the first representation and a digit of like significance of the second representation including in combination means for producing a third digital representation equal to the difference between the first and second representations for respective first and second representation digits in like places of significance less than the place of predetermined significance for which the digit of the first representation is greater than the digit of like significance of the second representation, means for producing a fourth digital representation equal to the difference between the first and second representations for respective first and second representation digits in like places of significance less than the place of predetermined significance for which the digit of the first representation is less than the digit of like significance of the second representation, means for producing a fifth representation equal to the difference between the third and fourth representations, means for determining when the difference between the third and fourth representations is less than and when equal to and when greater than zero, means for determining when the approximate difference between the first and second representations for digits in places of significance equal to and greater than the place of predetermined significance is zero and when equal to and when greater than the limit difference, means for producing a limit difference digital representation equal to the limit difference, means for producing a sixth representation equal to the difference between the limit representation and the fifth representation, and means for providing an output representation which is equal to the fifth representation when the approximate difference is zero and which is equal to the sixth representation when both the approximate difference is equal to the limit difference and the difference between the third and fourth representations is less than zero and which is equal to the limit representation when both the approximate difference is equal to the limit difference and the difference between the third and fourth representations is greater than zero and also when the approximate difference is greater than the limit difference and which is equal to one of the limit and sixth representations when both the approximate difference is equal to the limit difference and the difference between the third and fourth representations is equal to zero.

6. A comparator as in claim 5 in which the means producing the fifth and sixth representations comprise means producing a first current proportional to the third representation, means producing a second current proportional to the fourth representation, means producing a third current proportional to the limit representation, and means for comparing the three currents, and in which the means providing the output representation comprises means for disabling the third current means when the approximate difference is zero and enabling the third current means when the approximate difference is equal to and greater than the limit difference, and means for disabling the first and second current means when the approximate difference is greater than the limit difference and when both the approximate difference is equal to the limit difference and the difference between the third and fourth representations is greater than zero and enabling the first and second current means when both the approximate difference is equal to the limit difference and the difference between the third and fourth representations is less than zero and when the approximate difference is zero.

7. A comparator as in claim 5 in which the means producing the fifth and sixth and output representations include means producing currents proportional to the third and fourth limit representations, the current means comprising a number of transistors of one type, and in which the means determining when the difference between the third and fourth representations is less than and when equal to and when greater than zero and the means determining when the approximate difference is zero and when equal to and when greater than the limit difference comprise a number of transistors of the opposite type.

8. A comparator as in claim 5 including means for determining when the approximate difference is less than zero, and in which the output representation means comprises means for providing a negative digital output representation which is equal to the limit representation when the approximate difference is less than zero and also when both the approximate difference is zero and the difference between the third and fourth representations is less than zero.

9. A comparator as in claim 5 including means for determining when the approximate difference is less than zero, in which the output representation means includes means for providing a negative digital output representation which is equal to the limit representation when the approximate difference is less than zero and also when both the approximate difference is zero and the difference between the third and fourth representations is less than zero, in which the means producing the fifth and sixth representations comprise means producing three currents proportional to the third and fourth and limit representations respectively and means producing a fourth current proportional to the negative limit representation and means for comparing the four currents, and in which the means providing the output representation comprises means for disabling the fourth current means and enabling the means producing three currents when both the approximate difference is zero and the difference between the third and fourth representations is equal to and greater than zero and when the approximate difference is equal to and greater than the limit difference and for enabling the fourth current means and disabling the means producing three currents when both the approximate difference is zero and the difference between the third and fourth representations is less than zero and when the approximate difference is less than zero.

10. A comparator for determining the difference between first and second digital representations each made up of a plurality of binary bits and complements including in combination means for producing a first current proportional to the difference between said representations in every digital place of significance in which said first representation exceeds said second representation independently of differences in other adjacent places of significance in each instance in which the first representation exceeds the second representation, means for producing a second current proportional to the difference between said representations in every digital place of significance in which said second representation exceeds said first representation independently of differences in other adjacent places of significance in each instance in which the second representation exceeds the first representation, means for applying the bits and complements of said first and second representations to said first and second current-producing means, and means for obtaining the difference between said first and second currents.

11. A comparator for producing an indication of the difference between first and second digital representations each made up of a plurality of binary bits and complements including in combination means for producing a first current of a predetermined value when said first representation is greater than said second representation in digital places of significance equal to or greater than a significance corresponding to the maximum magnitude of error for which proportional control is desired, means for producing a second current of predetermined value when said first representation in digital places of significance equal to or greater than said given significance, means for producing a third current proportional to the difference between said representations when said first representation is greater than said second representation in digital places of less significance than said given significance, means for producing a fourth current proportional to the difference between said representations when said first representation is less than said second representation in digital places of less significance than said given significance and means responsive to said currents for producing a net current flow having a magnitude proportional to the difference between the quantities represented by said representations up to a difference corresponding to a difference represented by said digit of a predetermined significance and equal in magnitude to said predetermined current value for a difference outside the range of differences over which proportional control is desired.

12. A comparator for producing an indication of the difference between first and second digital representations each made up of a plurality of binary bits and complements including in combination means for producing a first current of the same value in each instance in which said first representation exceeds said second representation, means for producing a second current proportional to the difference between said representations in digital places of significance in which said second representation exceeds said first representation, means for producing a third current proportional to the difference between said representations in digital places of significance in which said first representation exceeds said second representation and means for comparing said second and third currents to produce a current proportional to the difference between said representations when said second representation exceeds said first representation.

13. A logic circuit responsive to logic voltages having a first value in on state and a second value in another state including in combination a device having a control terminal and adapted to assume a conductive condition and a nonconductive condition in response to the presence at its control terminal of respective potentials of different values, means for applying a biasing potential to said control terminal normally to cause said device to assume one of its conditions, means comprising a plurality of terminals for applying logic voltages to said control terminal, said logic voltage applying means being responsive to the presence of logic voltages of said first values at a predetermined number of said terminals for varying the potential at said control terminal to cause said device to assume its other condition.

14. A logic circuit responsive to logic voltages having a first value in one state and a second value in another state including in combination a device having a control terminal and adapted to assume a conductive condition and a nonconductive condition in response to the presence at its control terminal of respective potentials of different values, means for applying a biasing potential to said control terminal normally to cause said device to assume one of said conditions, means comprising a plurality of terminals for applying logic voltages to said control terminal, said logic voltage applying means being responsive to the presence of a logic voltage of said first value at any one of its terminals for varying the potential at said control terminal to cause said device to assume its other condition.

15. A logic circuit responsive to logic voltages having a first value in one state and a second value in another state including in combination a device having a control terminal and adapted to assume a conductive condition and a nonconductive condition in response to the presence at its control terminal of respective potentials of different values, means for applying a biasing potential to said control terminal normally to cause said device to assume one of said conditions, means comprising a plurality of terminals for applying logic voltages to said control terminal, said logic voltage applying means being responsive to the presence of a logic voltage at each of its terminals for varying the potential at said control terminal to cause said device to assume its other condition.

16. A logic circuit responsive to logic voltages having a first value in one state and a second value in another state including in combination a device having a control terminal and adapted to assume a conductive condition and a nonconductive condition in response to the presence at its control terminal of respective potentials of different values, means comprising a plurality of logic voltage input terminals and a biasing voltage input terminal for applying a potential to said base, respective resistances connected between said terminals and said control element, means for applying a biasing voltage to said biasing voltage input terminal normally to cause said device to assume one of said states, and means for applying logic voltages to said logic voltage input terminals, the relative weights of said resistances being such that said device assumes its other condition in response to the presence of logic voltages of one of said states at a predetermined number of said logic voltage input terminals.

17. A logic circuit responsive to logic voltages having a first value in one state and a second value in another state including in combination a transistor having an emitter and a collector and a base, said transistor being adapted to assume a first condition in which current flows through said emitter and said collector and a second condition in which no current flows through said emitter and collector in response to respective potentials at said base, means for applying a biasing potential to said base normally to cause said transistor to assume one of said conditions, means comprising a plurality of resistors connected between respective input terminals and said base for applying logic voltages to said base, the arrangement being such that said transistor assumes the other one of said conditions in response to the presence of logic voltages of said first value at a predetermined number of said input terminals.

18. A comparator for determining the difference between a first and a second digital representation in which the first representation has a plurality of digits in places of significance and in which the second digital representation has a plurality of digits in places of significance corresponding to the place of significance of the first representation digits including in combination means for producing a third digital representation equal to the difference between the first and second representations for respective first and second representation digits in like places of significance for which the digit of the first representation is greater than the digit of like significance of the second representation, means for producing a fourth digital representation equal to the difference between the first and second representations for respective first and second representation digits in like places of significance for which the digit of the first representation is less than the digit of like significance of the second representation, and means for determining the difference between the third and fourth digital representations, said difference determining means comprising means for producing a current proportional to the third representation, said current producing means comprising a number of transistors equal to the number of places of significance of the third representation, said transistors having collectors of the same type, said current producing means comprising also means responsive to the third representation for controlling the collector current of each transistor.

19. A comparator for determining the difference between a first and a second digital representation in which the first representation has a plurality of digits in places of significance and in which the second digital representation has a plurality of digits in places of significance corresponding to the place of significance of the first representation digits including in combination means for producing a third digital representation equal to the difference between the first and second representations for respective first and second representation digits in like places of significance for which the digit of the first representation is greater than the digit of like significance of the second representation, means for producing a fourth digital representation equal to the difference between the first and second representations for respective first and second representation digits in like places of significance for which the digit of the first representation is less than the digit of like significance of the second representation, and means for determining the difference between the third and fourth digital representations, said difference determining means comprising a magnetic member, means exerting a magnetomotive force of one polarity on the member proportional to the third representation, and means exerting a magnetomotive force of the opposite polarity on the member proportional to the fourth representation whereby the net flux in the magnetic member is proportional to the difference between the third and fourth representations.

20. A comparator for determining the difference between a first and a second digital representation in which the first representation has a plurality of digits in places of significance and in which the second digital representation has a plurality of digits in places of significance corresponding to the place of significance of the first representation digits including in combination means for producing a third digital representation equal to the difference between the first and second representations for respective first and second representation digits in like places of significance for which the digit of the first representation is greater than the digit of like significance of the second representation, means for producing a fourth digital representation equal to the difference between the first and second representations for respective first and second representation digits in like places of significance for which the digit of the first representation is less than the digit of like significance of the second representation, and means for determining the difference between the third and fourth digital representations, said difference determining means comprising a winding having a tap dividing the winding into two portions, means for producing a current proportional to the third representation in one portion of the winding and means for producing a current proportional to the fourth representation in the other portion of the winding, the currents in the two portions of the winding flowing in opposite directions whereby the net flux linking the winding is proportional to the difference between the third and fourth representations.

References Cited in the file of this patent
UNITED STATES PATENTS

| | | |
|---|---|---|
| 2,685,084 | Lippel | July 27, 1954 |
| 2,738,504 | Gray | Mar. 13, 1956 |
| 2,775,727 | Kernahan | Dec. 25, 1956 |
| 2,796,566 | Maynard | June 18, 1957 |
| 2,817,775 | Rosenberg | Dec. 24, 1957 |
| 2,844,309 | Ayres | July 22, 1958 |
| 2,885,655 | Smoliar | May 5, 1959 |
| 2,900,620 | Johnson | Aug. 18, 1959 |
| 2,906,891 | Scanlon | Sept. 29, 1959 |
| 2,910,597 | Strong | Oct. 27, 1959 |
| 2,923,475 | Ketchledge | Feb. 2, 1960 |